US008805406B1

(12) United States Patent
Casaburi et al.

(10) Patent No.: US 8,805,406 B1
(45) Date of Patent: Aug. 12, 2014

(54) USAGE OF GEO-TAGGING INFORMATION FROM MEDIA FILES TO DETERMINE GAPS IN LOCATION INFORMATION FOR MOBILE DEVICES

(75) Inventors: James Casaburi, Rancho Palos Verdes, CA (US); Michael Whipple, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 202 days.

(21) Appl. No.: 13/593,505

(22) Filed: Aug. 23, 2012

(51) Int. Cl.
*H04W 24/00* (2009.01)

(52) U.S. Cl.
USPC ...................................... 455/456.1

(58) Field of Classification Search
USPC ................. 455/456.1, 456.2, 456.3
See application file for complete search history.

(56) References Cited

U.S. PATENT DOCUMENTS

2008/0070593 A1* 3/2008 Altman et al. ................ 455/457
2011/0238755 A1* 9/2011 Khan et al. ................... 709/204

* cited by examiner

*Primary Examiner* — Joel Ajayi
(74) *Attorney, Agent, or Firm* — Brill Law Office; Jeffrey Brill (57) ABSTRACT

Geo-tags embedded in user created media files are used to maintain a location history record for a mobile computing device. At least one gap in the location history record for the mobile computing device is identified. The mobile computing device is scanned to identify accessible media files in at least one specific format created during the gap. Such specific media formats can comprise photographs, videos, audio, etc. Identified media files created during the gap are scanned for embedded geo-tags. The location history record for the mobile computing device is updated with data points comprising locations of the mobile computing device as identified by geo-tags embedded in specific identified media files (e.g., locations of the device when specific digital photographs were taken), and the times at which the specific identified media files were created (e.g., the times at which specific digital photographs were taken).

19 Claims, 4 Drawing Sheets

USAGE OF GEO-TAGGING INFORMATION FROM MEDIA FILES TO DETERMINE GAPS IN LOCATION INFORMATION FOR MOBILE DEVICES

TECHNICAL FIELD

This disclosure pertains generally to mobile computing devices, and more specifically to using geo-tags embedded in media files to determine location information for mobile devices.

BACKGROUND

Mobile computing devices such as smartphones and tablet computers are becoming more widely used every day. A variety of popular mobile operating systems are used on a number of different mobile platforms. For example, Apple's iOS (formerly known as iPhone OS) is a mobile operating system that runs on Apple mobile devices such as the iPhone, the iPod Touch and the iPad. Many apps for iOS are available for download from Apple's App Store. Android is an open-source, Linux based operating system for mobile devices. Many Android apps are available either for purchase or for free through Google Play (formerly known as Android Market). Android apps can also be downloaded from other online stores and additional third-party sites. Another example is Windows Phone, which is a mobile operating system developed by Microsoft, which runs on smartphones from vendors such as Nokia, Acer and Fujitsu. Users can download apps for Windows Phone from the Windows Phone Marketplace, which is run by Microsoft. iOS, Android and Windows Phone are just examples of currently popular mobile operating systems, but others exist as well.

Mobile computing devices are typically equipped with certain popular features, such as a web browser, a digital camera and apps to manage a library of photographs and videos, sound input/output hardware and apps for managing a library of audio recordings, apps for interacting with social media sites, apps for reading print media, etc. Some apps for mobile computing devices provide services to users based on current physical location. One of two mechanisms can be used to determine the current physical location of a mobile computing device in order to provide location based services. These mechanisms can be classified as providing either "fine" or "coarse" positions respectively. Fine location data is provided by Global Positioning System ("GPS") receivers on the mobile computing devices, whereas coarse location data is provided by WiFi triangulation and/or cell tower triangulation. An example of an app that tracks the location of a mobile device to provide user services is a mapping app which displays the device's current location on a map and shows restaurants, business and other attractions that are in the area. Some social networking applications track the positions of members and their friends, show places where members have been, indicate their current positions, and show when friends are located close to each other. Anti-theft apps track a mobile device's location, so that if the device is stolen or lost and later recovered, the location history can be used to determine where the device has been from the time of disappearance to the time of recovery.

An app that track mobile device location information must be installed on the device before it can start tracking location information. Additionally, once the app has been installed, it can be shutdown, denied location information, and under some mobile operating systems such as iOS, cannot be forced to auto-start. Apps cannot track the location of a device during periods of time when the app is not being run, nor before the app has been installed, nor when location services are denied to the app. This results in gaps in location history for apps that track locations of mobile computing devices.

It would be desirable to address these issues.

SUMMARY

Geo-tags embedded in user created media files are used to maintain a location history record for a mobile computing device. At least one gap in the location history record for the mobile computing device is identified. This identification can comprise identifying a gap in the existing location history record for the mobile device, for example a gap in the record of greater than a specific length of time. Determining that no location history record exists for the mobile computing device can itself be considered an identification of a gap. In some embodiments, a specific range of time is received to check for gaps in the location history record for the mobile computing device. The mobile computing device is scanned to identify accessible media files in at least one specific format created during the gap. Such specific media formats can comprise photographs, videos, audio, etc. For example, the photo library of the mobile computing device can be scanned for digital photographs. Identified media files created during the gap are scanned for embedded geo-tags, such as geo-tags in Exchange image file format (EXIF). The location history record for the mobile computing device is updated, with one or more data points comprising a location of the mobile computing device as identified by a geo-tag embedded in a specific identified media file (e.g., the location of the device when a specific digital photograph was taken), and the time at which the specific identified media file was created (e.g., the time at which the specific digital photograph was taken).

Geo-tags in user created media files can be used further to maintain a location history record for the mobile computing device. For example, the creation on the mobile computing device of media files in one or more specific format(s) can be detected, and the detected created media files can be scanned for embedded geo-tags. The location history record for the mobile computing device can then be updated with data points comprising the location of the mobile computing device as identified by the geo-tags, and the times at which the detected created media files were created. As another example, the mobile computing device can be periodically scanned to identify newly created media files. Identified newly created media files are then scanned for embedded geo-tags, which are used to update the location history record for the mobile computing device.

In different embodiments, the geo-tag based location history record can be used in a variety of contexts, such as in order to determine where a mobile computing device was located during a period of time when it was missing, to update gaps in a location history of a social media member associated with the mobile computing device, or to update gaps in a location history of a child who uses the mobile computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
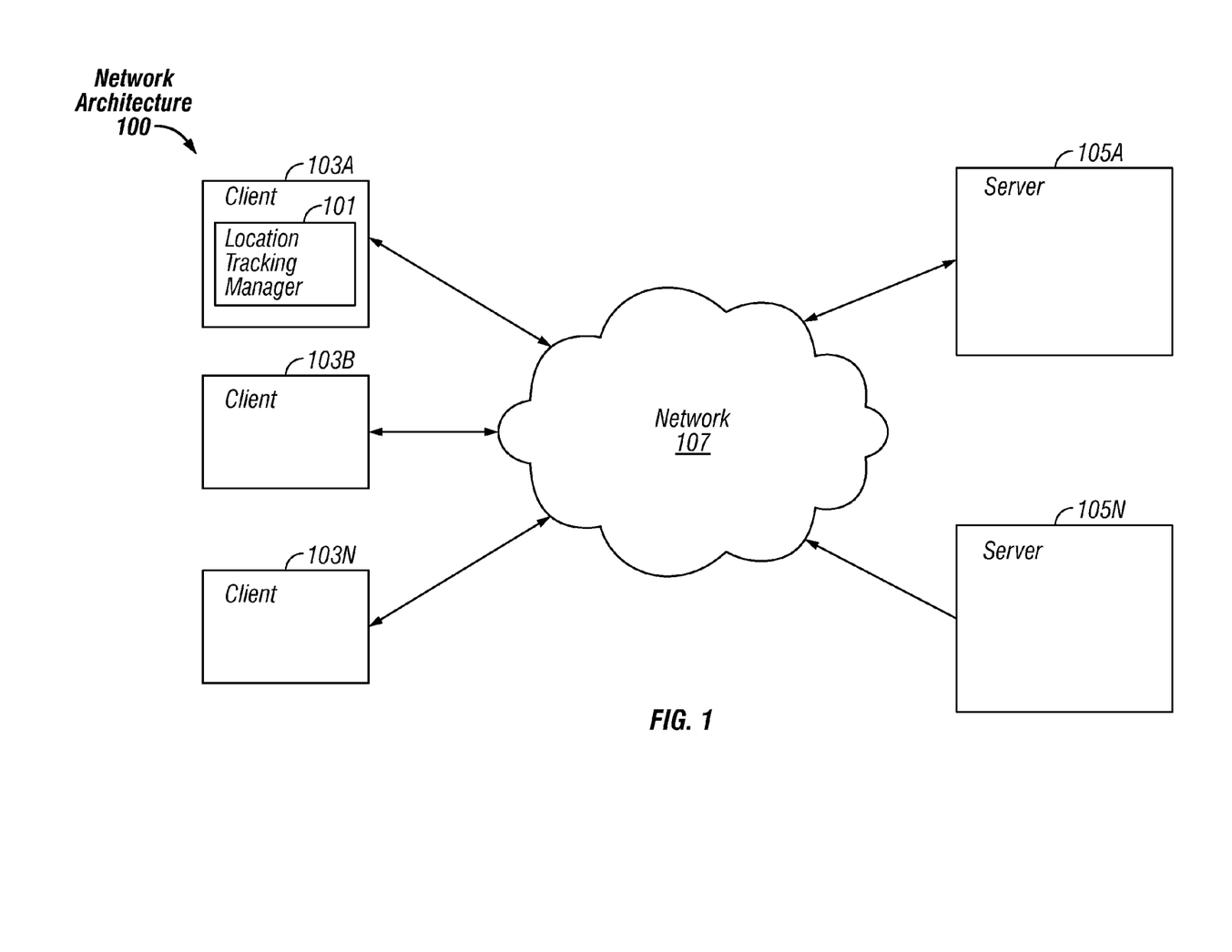
FIG. 1 is a block diagram of an exemplary network architecture in which a location tracking manager can be implemented, according to some embodiments.

FIG. 1 is a block diagram illustrating an exemplary network architecture 100 in which a location tracking manager 101 can be implemented. The illustrated network architecture 100 comprises multiple clients 103A, 103B and 103N, as well as multiple servers 105A and 105N. In FIG. 1, the location tracking manager 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
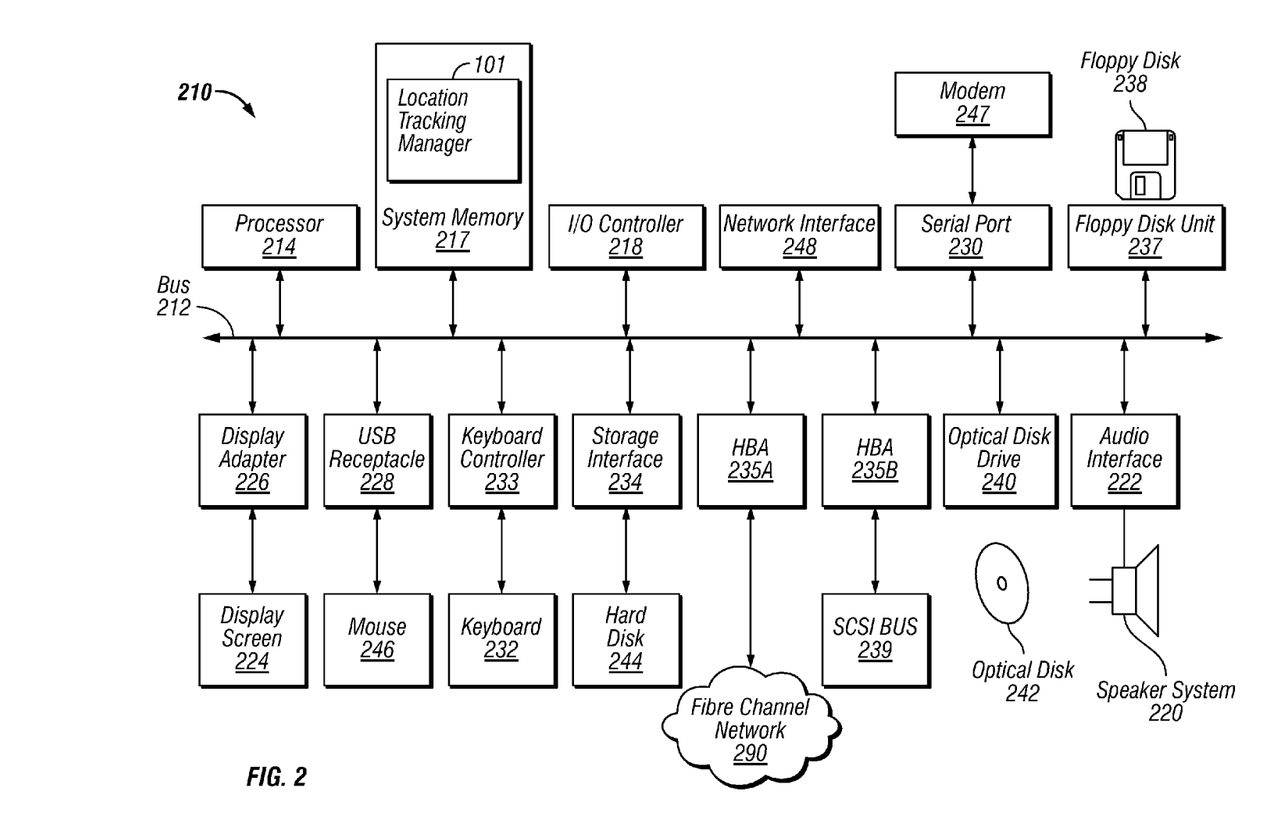
FIG. 2 is a block diagram of a computer system suitable for implementing a location tracking manager, according to some embodiments.

FIG. 2 is a block diagram of a computer system 210 suitable for implementing a location tracking manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components not illustrated in FIG. 2 may be connected in a similar manner (e.g., document scanners, digital cameras 310, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the location tracking manager 101 is illustrated as residing in system memory 217. The workings of the location tracking manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
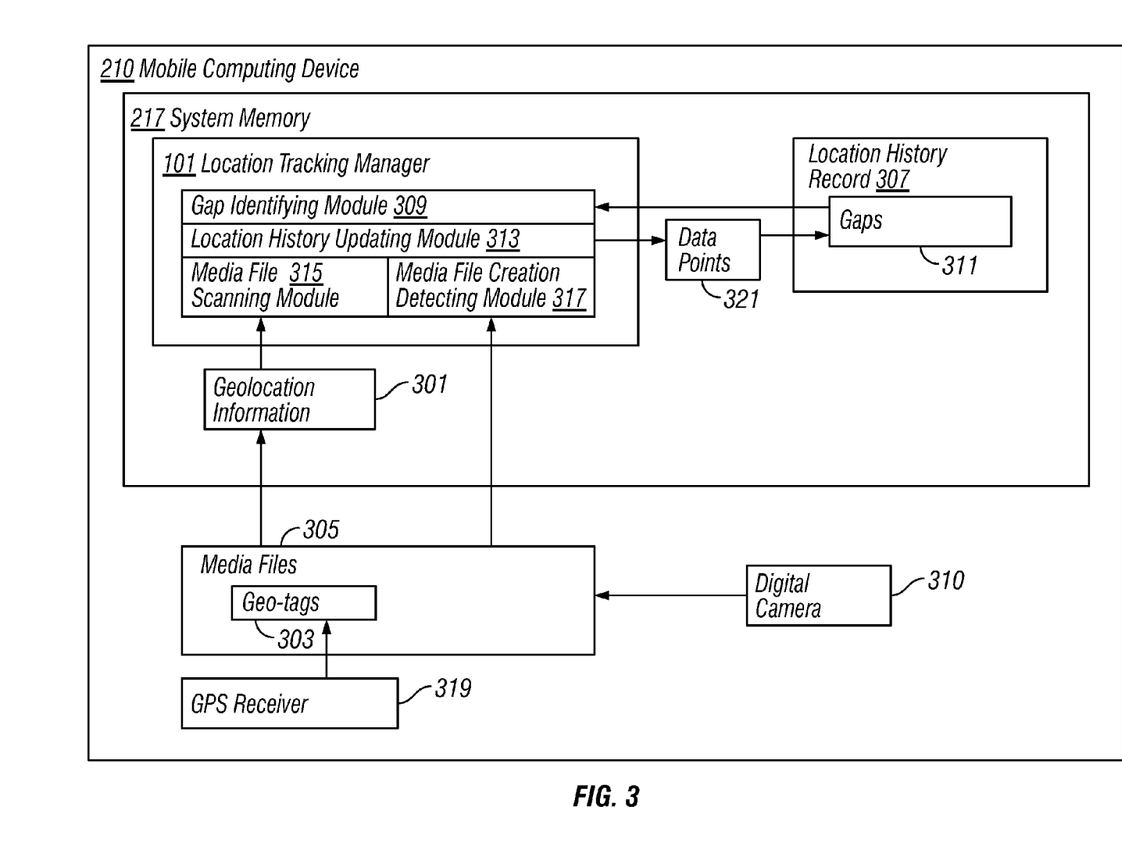
FIG. 3 is a block diagram of the operation of a location tracking manager, according to some embodiments.

FIG. 3 illustrates a location tracking manager 101 running in the system memory 217 of a mobile computing device 210, according to some embodiments. For example, the functionality of the location tracking manager 101 can be instantiated in the form of an app that runs under a mobile operating system such as iOS, Android, Windows Phone, etc. As described above, the functionalities of the location tracking manager 101 can reside on a client 103 (including but not limited to a client 103 in the form of a mobile computing device), a server 105, or be distributed between multiple computer systems 210, including within a cloud-based computing environment in which the functionality of the location tracking manager 101 is provided as a service over a network 107. It is to be understood that although the location tracking manager 101 is illustrated in FIG. 3 as a single entity, the illustrated location tracking manager 101 represents a collection of functionalities, which can be instantiated as a single or multiple modules on one or more computing devices 210 as desired. FIG. 3 illustrates a specific embodiment in which the location tracking manager 101 is instantiated in the form of specific, multiple modules which are all located on a single mobile computing device 210. In other embodiments, the functionalities of the location tracking manager 101 are distributed and/or instantiated in other ways. For example, in one embodiment the location history updating module 313 of the location tracking manager 101 is implemented on an external server 105, whereas the other modules are implemented on the mobile computing device 210. It is to be understood that the modules of the location tracking manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the location tracking manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the location tracking manager 101 determines geo-location information 301 for a mobile computing device 210 from geo-tags 303 embedded in user created media files 305, such as photographs $305_{photo}$ the user has taken with the onboard digital camera 310. This location information 301 indicates where the mobile computing device 210 was located at the times the various media files 305 were created. By gleaning location information 310 from user created media files 305, the location tracking manager 101 can fill in gaps in the location history record 307 for the mobile computing device 210, for periods of time during which location information 301 is otherwise unavailable. The location tracking manager 101 can use location information 301 gleaned this way to create a record 307 of the device's location history, or to fill in gaps 311 in an existing record 307.

In one embodiment, on startup of the location tracking manager 101, a gap identifying module 309 of the location tracking manager 101 checks for a previously stored record 307 of the location history of the mobile computing device 210. It is to be understood that such a location history record 307 can be in the form of a database or other suitable storage mechanism. In one embodiment, the location history record 307 is created and maintained by the location tracking manager 101, although in other embodiments the location tracking manager 101 can use a location history record 307 initially created by another app or component on the mobile computing device 210. In one embodiment, multiple apps and/or other components maintain the location history record 307.

Responsive to identifying an existing location history record 307 for the mobile computing device 210, the gap identifying module 309 checks the contents of the location history record 307 to determine whether it contains any gaps 311 to be filled. What specifically is considered a gap 311 to be filled can vary between embodiments. In some embodiments, temporal gaps 311 in the location history greater than a given length of time are classified as gaps 311 to be filled.

The specific length of time that triggers such a classification is a variable design parameter, and different values can be used in different embodiments (e.g., ten minutes, thirty minutes, one hour, three hours, five hours, etc.), depending upon the level of precision desired in the record keeping. In one embodiment, the gap identifying module 309 checks for gaps 311 in the location history record 307 starting from a specific length of time prior to the present, and running to the present or to some given cut-off time. How far back to start checking for gaps 311 is a variable design parameter, and different values such as one day, three days, five weeks, three months or one year can be used in different embodiments. In one embodiment, a specific range of times and/or dates to be check for gaps 311 in the location history record 307 can be input to the location tracking manager 101, for example by a user of the mobile computing device 210, through a graphical user interface, a command line, a file, etc. An example of an entered range to check for gaps 311 in location history could be the time from which a mobile computing device 210 went missing to the time it was recovered. In one embodiment, the lack of an existing location history record 307 is itself considered a gap 311 to be filled.

The location tracking manager 101 attempts to fill identified gaps 311 in the location history record 307. To attempt to fill a specific gap 311 in the location history record 307, a media file scanning module 315 of the location tracking manager 101 scans the mobile computing device 210 to identify accessible media files 305 in one or more specific formats created during the gap 311. The formats in question are selected based on the likelihood that media files 305 in these formats contain geo-tags 303. In one embodiment, this scanning takes the form of scanning the photo library 315 on the mobile computing device 210 for any photographs $305_{photo}$ taken during the gap 311. As used herein the term "photo library" means a logical, physical or virtual location on or accessible to a mobile computing device 210 in which digital photographs $305_{photo}$ are stored. In some embodiments media libraries on the mobile computing device 210 other than the photo library 317 are scanned for accessible media files 305. It is to be understood that media libraries, including photo libraries 317, comprise data stores on the mobile computing device 210. Depending upon the mobile environment configuration and the data store in question, these data stores can be shared between multiple apps on the mobile computing device 210, and/or can be private to a specific app which in turn can grant access thereto to other apps, such as the app in which the location tracking manager 101 is instantiated. As used herein the term "photograph" means a digital representation of a visual image in a digital image format such as JPEG (Joint Photographic Experts Group), JFIF (JPEG File Interchange Format), TIFF (Tagged Image File Format), RAW, PNG (Portable Network Graphics), GIF (Graphics Interchange Format), etc. The time at which a stored digital photograph $305_{photo}$ was taken can be determined by time stamp metadata in the stored digital photograph $305_{photo}$ (or by the file system time attribute). The photo library 315 is typically accessible without special any permissions, so the media file scanning module 315 can typically access any photographs $305_{photo}$ therein. If one or more stored digital photograph(s) $305_{photo}$ are identified that were taken during the gap 311, the media file scanning module 315 scans the photographs $305_{photo}$ for geo-tags 303, identifying the location of the mobile computing device 210 at the time the photograph $305_{photo}$ was taken.

An example of a geo-tag 303 in this context is an Exchangeable image file format (EXIF) tag. EXIF is a standard that specifies the formats for digital images and tags used by digital cameras 309, including those onboard smartphones and other mobile computing devices 210. EXIF currently supports adding metadata tags to specific digital file formats such as JPEG and TIFF. Among other metadata, EXIF specifies a format standard for storing the current geo-location 301 of the mobile computing device 210 at the time a photograph is taken (as determined by the onboard GPS receiver 319) in the stored digital photograph $305_{photo}$. This is known as geo-tagging or geo-coding. As used herein, the term "geo-tag" means geo-location information 301 stored in a media file 305. It is to be understood that EXIF is an example of a tagging standard that is used for geo-tagging digital photographs $305_{photo}$. Other tagging standards and formats are also possible, and in other embodiments digital photographs $305_{photo}$ and other types of media files 305 are scanned for geo-tags 303 in other formats.

If geo-tags 303 are embedded in one or more stored digital photograph(s) $305_{photo}$ that were taken during the gap 311, a location history updating module 313 of the location tracking manager 101 is able to determine specific location history data points 321 for the mobile computing device 210, and fill in the gap 311 in the location history record 307 accordingly. For each located digital photograph $305_{photo}$ that was taken during the gap 311 and contains a geo-tag 303, the location history updating module 313 associates the geo-location 301 identified by the geo-tag 303 with the time the photograph $305_{photo}$ was taken, as determined from tagging information embedded in the file 305 and/or the file system time attribute. The location history updating module 313 proceeds to add that time geo-location correlation as a data point 321 to the location history record 307 for the mobile computing device, thereby filling in the gap 311. The more digital photographs $305_{photo}$ with embedded geo-tags 303 are located, and the more evenly they are spread over the time period in question, the more completely can the gap 311 be filled in.

It is to be understood that other types of media files 305 can also be identified and scanned for geo-tags 303. For example, digital video files $305_{video}$ (for example in formats such as MPEG) frequently contain EXIF geo-tags 303. In some embodiments, the media file scanning module 315 scans user created digital video files $305_{video}$ for geo-tags 303, and the location history updating module 313 uses the resulting information to fill gaps 311 in the location history record 307, in the manner described above in the context of digital photographs $305_{photo}$. In other embodiments, other types of media files 305 are scanned for geo-tags 303, such as audio files 305.

In addition to filling in gaps 311 in an existing location history record 307, the location tracking manager 101 can also use geo-tags 303 in user created media files 305 to maintain the location history record 307 when location services are not otherwise made available to the location tracking manager 101. In one embodiment, when the location tracking manager 101 starts-up, it checks for the availability of conventional location services on the mobile computing device 210. If location services are available, the location tracking manager 101 can use them to maintain the location history record 307 for the mobile computing device 210, periodically adding data points 321 comprising the current time and geo-location 301 to the record 307. The frequency with which to update the record 307 with a current data point 321 is a variable design parameter, and different values can be used in different embodiments (e.g., every minute, every ten minutes, every thirty minutes, every hour, etc.).

Where the location tracking manager 101 determines that location services are not available (for example, location services are being denied to the location tracking manager 101 by the mobile computing device 210 at an operating system or administrative level), a media file creation detecting module 317 of the location tracking manager 101 detects when media files 305 of one or more specific type(s) are created on the mobile computing device 210. In one embodiment, the media file creation detecting module 317 detects when a photograph $305_{photo}$ is taken with the onboard digital camera 310, whereas in other embodiments the media file creation detecting module 317 also or instead detects the creation of other formats of media files 305, such as videos and/or sound recordings. In response to detecting the creation of a media file 305, the media file scanning module 315 scans the created media file 305 for a geo-tag 303. If a geo-tag 303 is located, the location history updating module 313 updates the location history record 307 by adding a data point 321 consisting of the correlation of the geo-location 301 indicated by the geo-tag 303 and the time at which the media file 305 was created. Using this technique, the location tracking manager 101 maintains the location history record 307 of the mobile computing device 210, even when conventional location services are not made available to the location tracking manager 101 by the mobile computing device 210. In another embodiment, rather than detect media files 305 as they are created, the mobile computing device 210 is periodically scanned for newly created media files 305 (i.e., media files 305 created since the last time such a scan was conducted). The frequency with which to conduct such scans is a variable design parameter. Newly created media files 305 identified by the scanning are then scanned for embedded geo-codes 303, which can be used to update the location history record 307 using the functionality described above.

Descriptions of some example uses further illuminate the operations of the location tracking manager 101, according to various embodiments. It is to be understood that the following are simply examples of use cases, and in other embodiments the location tracking manager 101 can be used in other scenarios as desired. One example use of the location tracking manager 101 is in an anti-theft app for mobile devices 210. Mobile computing devices 210 are frequently lost or stolen. If a mobile computing device 210 is missing, it is desirable to learn its location to assist with recovery. If the mobile location tracking manager 101 is running on the missing mobile device 210, it can use geo-tagged media files 305 to track the location history of the device 210, even where location services are not otherwise available to the mobile location tracking manager 101. In one embodiment, the location tracking manager 101 can transmit current location information 301 concerning the mobile device 210 to an off device computer 210, such as another computer 210 under the control of the owner of the mobile computing device 210, or to law enforcement. Where the location tracking manager 101 is either not installed or not actively running on the mobile computing device 210, it can be run after the fact if the device is later recovered. That way, if any geo-tagged media files 305 where created while the device was missing (for example, if the thief took any pictures), the geo-location information 301 gleaned from the media files 305 can be used to create data points 321 to fill in the gap 311 of time from when the device 210 went missing to the time it was recovered, in order to learn where the device 210 was when it was missing.

Another example use case for the location tracking manager 101 is a social media app with check-ins, used for functions such as tracking locations where members and their friends have been. In such a context, the location tracking manager 101 can fill in gaps 311 in the location history records 307 of social media members. Another example is the case of a monitoring app used by parents, in which the location tracking manager 101 could be used to fill in gaps 311 in the location history of children or other monitored parties.

Figure 4:
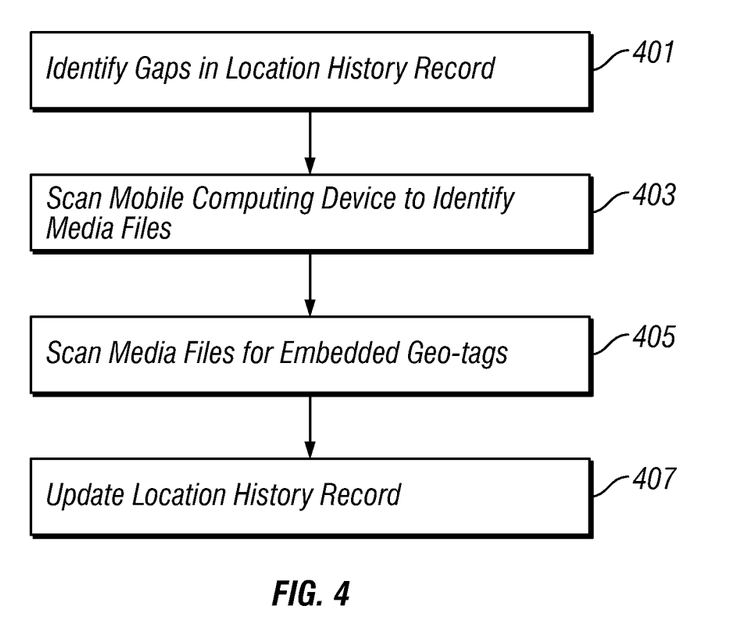
FIG. 4 is a flowchart illustrating steps for the operation of a location tracking manager, according to some embodiments.

FIG. 4 is a flowchart showing steps of the operation of a location tracking manager 101, according to some embodiments. The gap identifying module 309 identifies 401 at least one gap 311 in the location history record 307 for the mobile computing device 210. The media file scanning module 315 scans 403 the mobile computing device 210 to identify accessible media files 305 in at least one specific format (e.g., digital photographs $305_{photo}$) created during the gap 311. The media file scanning module 315 then scans 405 identified accessible media files 305 created during the gap 311 for embedded geo-tags 303. The location history updating module 313 updates 407 the location history record 307 for the mobile computing device 210 with data points 321 comprising locations of the mobile computing device 210 as identified by geo-tags 303 embedded in identified media files 305 and the times at which identified media files 305 were created.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using geo-tags embedded in user created media files to update a location history record for a mobile computing device, the method comprising:
   identifying at least one gap in the location history record for the mobile computing device;
   scanning the mobile computing device to identify accessible media files in at least one specific format created during the gap, wherein the gap further comprises a period of time during which location services data were not being made available to the location history record, wherein location services data further comprise data provided by Global Positioning System or by wireless triangulation;
   scanning identified media files created during the gap for embedded geo-tags;
   updating the location history record for the mobile computing device with at least one data point comprising a location of the mobile computing device as identified by a geo-tag embedded in a specific identified media file and a time of creation of the specific identified media file; and
   using the updated media location history for the mobile computing device in order to determine where the mobile computing device was located during a period of time from when it went missing to when it was recovered.

2. The method of claim 1 wherein identifying at least one gap in the location history record for the mobile computing device further comprises:
   identifying a gap of greater than a specific length of time in an existing location history record for the mobile computing device.

3. The method of claim 1 wherein identifying at least one gap in the location history record for the mobile computing device further comprises:
   determining that no location history record exists for the mobile computing device.

4. The method of claim 1 wherein identifying at least one gap in the location history record for the mobile computing device further comprises:
   receiving a specific range of time to check for gaps in the location history record for the mobile computing device; and
   identifying a gap in the specific range of time in the location history record for the mobile computing device.

5. The method of claim 1 wherein scanning the mobile computing device to identify accessible media files in at least one specific format during the gap further comprises:
   scanning the mobile computing device to identify digital photographs created during the gap.

6. The method of claim 1 wherein scanning the mobile computing device to identify accessible media files in at least one specific format created during the gap further comprises:
   scanning the mobile computing device to identify digital videos created during the gap.

7. The method of claim 1 wherein scanning the mobile computing device to identify accessible media files in at least one specific format further comprises:
   scanning the photo library of the mobile computing device for digital photographs.

8. The method of claim 1 wherein scanning identified media files created during the gap for embedded geo-tags further comprises:
   scanning identified media files created during the gap for embedded geo-tags in Exchange image file format (EXIF).

9. The method of claim 1 further comprising:
   using geo-tags in user created media files to maintain a location history record for the mobile computing device.

10. The method of claim 9 further comprising:
    detecting the creation of media files in at least one specific format on the mobile computing device;
    scanning detected created media files in the at least one specific format for embedded geo-tags;
    updating the location history record for the mobile computing device with at least one data point comprising a location of the mobile computing device as identified by a geo-tag embedded in a specific detected created media file and a time of creation of the specific detected created media file.

11. The method of claim 9 further comprising:
    periodically scanning the mobile computing device to identify newly created media files in at least one specific format;
    scanning newly created media files in the at least one specific format for embedded geo-tags;
    updating the location history record for the mobile computing device with at least one data point comprising a location of the mobile computing device as identified by a geo-tag embedded in a specific newly created media file and a time of creation of the specific newly created media file.

12. The method of claim 1 further comprising:
  updating gaps in a location history of a social media member associated with the mobile computing device.

13. The method of claim 1 further comprising:
  updating gaps in a location history of a child who uses the mobile computing device.

14. At least one non-transitory computer readable medium for using geo-tags embedded in user created media files to update a location history record for a mobile computing device, the at least one non-transitory computer readable medium storing program code that, when loaded into computer memory and executed by a processor performs the following steps:
  identifying at least one gap in the location history record for the mobile computing device;
  scanning the mobile computing device to identify accessible media files in at least one specific format created during the gap, wherein the gap further comprises a period of time during which location services data were not being made available to the location history record, wherein location services data further comprise data provided by Global Positioning System or by wireless triangulation;
  scanning identified media files created during the gap for embedded geo-tags;
  updating the location history record for the mobile computing device with at least one data point comprising a location of the mobile computing device as identified by a geo-tag embedded in a specific identified media file and a time of creation of the specific identified media file; and
  using the updated media location history for the mobile computing device in order to determine where the mobile computing device was located during a period of time from when it went missing to when it was recovered.

15. The at least one non-transitory computer readable medium of claim 14 wherein the program code for scanning the mobile computing device to identify accessible media files in at least one specific format created during the gap further comprises:
  program code for scanning the mobile computing device to identify digital photographs created during the gap.

16. The at least one non-transitory computer readable medium of claim 14 wherein the program code for scanning the mobile computing device to identify accessible media files in at least one specific format further comprises:
  program code for scanning the photo library of the mobile computing device for digital photographs.

17. The at least one non-transitory computer readable medium of claim 14 wherein the program code for scanning identified media files created during the gap for embedded geo-tags further comprises:
  program code for scanning identified media files created during the gap for embedded geo-tags in Exchange image file format (EXIF).

18. The at least one non-transitory computer readable medium of claim 14 further comprising:
  program code for using geo-tags in user created media files to maintain a location history record for the mobile computing device.

19. A mobile computing device for using geo-tags embedded in user created media files to update a location history, the mobile computing device comprising:
  a processor;
  computer memory;
  a gap identifying module residing in the computer memory, configured to identify at least one gap in the location history record for the mobile computing device;
  a media file scanning module residing in the computer memory, configured 1) to scan the mobile computing device to identify accessible media files in at least one specific format created during the gap, wherein the gap further comprises a period of time during which location services data were not being made available to the location history record, wherein location services data further comprise data provided by Global Positioning System or by wireless triangulation, and 2) to scan identified media files created during the gap for embedded geo-tags;
  a location history updating module residing in the computer memory, configured to update the location history record for the mobile computing device with at least one data point comprising a location of the mobile computing device as identified by a geo-tag embedded in a specific identified media file and a time of creation of the specific identified media file; and
  a location tracking manager residing in the computer memory, configured to use the updated media location history for the mobile computing device in order to determine where the mobile computing device was located during a period of time from when it went missing to when it was recovered.

\* \* \* \* \*